(12) United States Patent
Cottrille et al.

(10) Patent No.: US 7,051,274 B1
(45) Date of Patent: May 23, 2006

(54) SCALABLE COMPUTING SYSTEM FOR MANAGING ANNOTATIONS

(75) Inventors: Scott C. Cottrille, Redmond, WA (US); Yoram Yaacovi, Redmond, WA (US); Antony Halim, Bellevue, WA (US)

(73) Assignee: Microsoft Corporation, Redmond, WA (US)

(*) Notice: Subject to any disclaimer, the term of this patent is extended or adjusted under 35 U.S.C. 154(b) by 0 days.

(21) Appl. No.: 09/339,733

(22) Filed: Jun. 24, 1999

(51) Int. Cl.
*G06F 17/00* (2006.01)

(52) U.S. Cl. ........................ 715/512; 709/223
(58) Field of Classification Search ............... 707/512, 707/526, 500.1; 709/203, 249, 223; 715/512, 715/526, 500.1

See application file for complete search history.

(56) References Cited

U.S. PATENT DOCUMENTS

| | | | | |
|---|---|---|---|---|
| 5,822,539 A | * | 10/1998 | van Hoff | 709/203 |
| 5,826,025 A | * | 10/1998 | Gramlich | 707/4 |
| 6,020,884 A | * | 2/2000 | MacNaughton et al. | 345/747 |
| 6,094,675 A | * | 7/2000 | Sunaga et al. | 707/10 |
| 6,105,055 A | * | 8/2000 | Pizano et al. | 340/825.01 |
| 6,289,362 B1 | * | 9/2001 | Van Der Meer | 715/501.1 |
| 6,332,144 B1 | * | 12/2001 | deVries et al. | 707/102 |
| 6,571,295 B1 | * | 5/2003 | Sidana | 709/246 |
| 6,581,096 B1 | * | 6/2003 | Cottrille et al. | 709/223 |
| 6,687,878 B1 | * | 2/2004 | Eintracht et al. | 715/512 |

OTHER PUBLICATIONS

Liberte, "Scope of the Annotation Protocol", Dec. 1995, <www.hypernews.org/~liberte/www/annotation-protocol-design>, pp. 1-3.*
"A Protocol for Scalable Group and Public Annotations", http://www.hypernews.org/, liberte/www/scalable-annotations.html (9 pages).
"Alexa 3.0—Quick Tour: Alexa Menu", http://www.alexa.com/alexa30/tour/tour_30_alexamenu.html (2 pages).
"Alexa 3.0—Quick Tour: Alexa Snapshot", http://www.alexa.com/alexa30/tour/tour_30_snapshot.html (1 page).
"Alexa 3.0—Quick Tour: Auto Launch", http://www.alexa.com/alexa30/tour/tour_30_autolaunch.html (1 page).
"Alexa 3.0—Quick Tour: Contact Information", http://www.alexa.com/alexa30/tour/tour_30_sitereg.html (1 page).
"Alexa 3.0—Quick Tour: Horizontal—Vertical", http://www.alexa.com/alexa30/tour/tour_30_horizontal/html (2 pages).
"Alexa 3.0—Quick Tour: Overview", http://www.alexa.com/alexa30/tour/index.html (1 page).
"Alexa 3.0—Quick Tour: Related Links", http://www.alexa.com/alexa30/tour/tour_30_related.html (1 page).

(Continued)

*Primary Examiner*—Sanjiv Shah
(74) *Attorney, Agent, or Firm*—Christensen O'Connor Johnson Kindness PLLC

(57) ABSTRACT

A scalable computing system for managing annotations is capable of handling requests for annotations to millions of documents a day. The computing system consists of multiple tiers of servers. A tier I server indicates whether there are annotations associated with a content source. A tier II server indexes the annotations. A tier III server stores the body of the annotation.

22 Claims, 10 Drawing Sheets

OTHER PUBLICATIONS

"Alexa 3.0—Quick Tour: Search", http://www.alexa.com/alexa30/tour/tour_30_search.html (1 page).

"Alexa 3.0—Quick Tour: Site Statistics", http://www.alexa.com/alexa30/tour/tour_30_sitestats.html (1 page).

"Beyond Browsing: Shared Comments, SOAPs, Trails, and On-line Communities", *Third International World-Wide Web Conference, Darmstadt, Germany*, http://www-diglib.stanford.edu/diglib/pub/reports/brio_www95.html (12 pages), (Apr. 10-14, 1995).

"Pan-Browser Support for Annotations and Other Meta-Information on the World Wide Web", *Fifth International World Wide Web Conference, Paris, France*, http://www5conf.inria.fr/fich_html/papers/P15/Overview.html (17 pages), (May 6-10, 1996).

"Tools for Collaborative Learning", http://simon.cs.cornell.edu/home/dph/annotations/annotations.html (2 pages), (Last visited May 27, 1999).

* cited by examiner

US 7,051,274 B1

SCALABLE COMPUTING SYSTEM FOR MANAGING ANNOTATIONS

FIELD OF THE INVENTION

This invention relates generally to information systems and more particularly to a computing system having a scalable architecture that is capable of managing annotations to millions of content sources.

COPYRIGHT NOTICE/PERMISSION

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever. The following notice applies to the software and data as described below and in the drawing hereto: Copyright © 1998, Microsoft Corporation, All Rights Reserved.

CROSS REFERENCES CROSS-REFERENCE TO RELATED APPLICATIONS

This application is related to co-filed and co-assigned U.S. patent application titled "Computing System for Managing Dynamic Communities." Application Ser. No. 09/339,635 filed Jun. 24, 1999, now U.S. Pat. No. 6,581,096, titled "Scalable Computing System for Managing Dynamic Communities in Multiple Tier Computing System". This application is also related to co-filed and co-assigned U.S. patent application titled "Associating Annotations with a Content Source."Application Ser. No. 09/339,634, filed Jun. 24, 1999.

BACKGROUND OF THE INVENTION

The Internet is a worldwide collection of networks that span over 100 countries and connect millions of computers. As of 1998, the Internet had more than 100 million users worldwide and that number continues to grow rapidly. The World Wide Web (WWW) is one of the fastest growing aspects of the Internet. The WWW is composed of computers that support the hypertext transfer protocol (HTTP) which is a common protocol for exchanging information. A WWW client program known as a browser runs on a user's computer. One commonly available browser is Microsoft's® Internet Explorer Web browser.

A variety of content sources for text, graphics, sound, and video can all be accessed via the WWW with a browser. Most users who access a content source are unable to modify the content source. However, there are many reasons why users who did not create a content source might want to communicate with other users about the content source. For example, users may wish to share a common interest, to provide additional information relevant to a content source, to critique or review a content source and so on.

For these and other reasons, there is a need in the art for a computing system that manages information associated with a variety of content sources.

SUMMARY OF THE INVENTION

A scalable computing system capable of associating annotations with millions of content sources is described. An "annotation" refers to any content associated with a document space. The computing system consists of multiple tiers of servers. A tier I server indicates whether there are annotations associated with a content source. A tier II server indexes the annotations. A tier III server stores the body of the annotation. A client communicates with each one of the multiple tiers of servers to request annotations associated with a current document space.

Another aspect of the invention is a computerized method of posting an annotation. A client initiates the posting method by sending an annotation post to a tier III server. The tier III server stores a first portion of the annotation on the tier III server and sends a second portion of the annotation from the tier III server to a tier II server. The tier II server stores the second portion of the annotation on the tier II server and sends association information from the tier II server to a tier I server. The Tier I server stores the association information. The annotation is accessible by the client after it is stored by the Tier I server.

A further aspect of the invention is a computerized method for managing annotations. A tier I server stores a plurality of associations with references to a tier II server for each association. A tier II server stores an indexing identifier for each one of the annotations and a reference to a tier III server for each one of the annotations. A tier III server stores content for each one of the annotations. In response to receiving a context document identifier from a client, the tier I server provides a first response to the client. The first response comprises one for more associations for the context document identifier and the reference to the tier II server for each one of the associations.

In addition to the aspects and advantages of the present invention described in this summary, further aspects and advantages of the invention will become apparent by reference to the drawings and by reading the detailed description that follows.

DETAILED DESCRIPTION OF THE INVENTION

In the following detailed description of exemplary embodiments of the invention, reference is made to the accompanying drawings which form a part hereof, and in which is shown by way of illustration specific exemplary embodiments in which the invention may be practiced. These embodiments are described in sufficient detail to enable those skilled in the art to practice the invention, and it is to be understood that other embodiments may be utilized and that logical, mechanical, electrical and other changes may be made without departing from the scope of the present invention. The following detailed description is, therefore, not to be taken in a limiting sense, and the scope of the present invention is defined only by the appended claims.

The detailed description is divided into nine sections. In the first section, the hardware and the operating environment in conjunction with which embodiments of the invention may be practiced are described. In the second section, a system level overview of the invention is presented. In the third section, a tier I server is described in detail. In the fourth section, a tier II server is described in detail. In the fifth section, a tier II server is described in detail. In the sixth section, an example method for posting an annotation is provided. In the seventh section, data structures of an example embodiment of the invention are provided. In the eighth section, example client action scenarios are described. In the ninth section, a particular implementation of the invention in Microsoft's® Community Explorer product is described.

Hardware and Operating Environment

Figure 1:
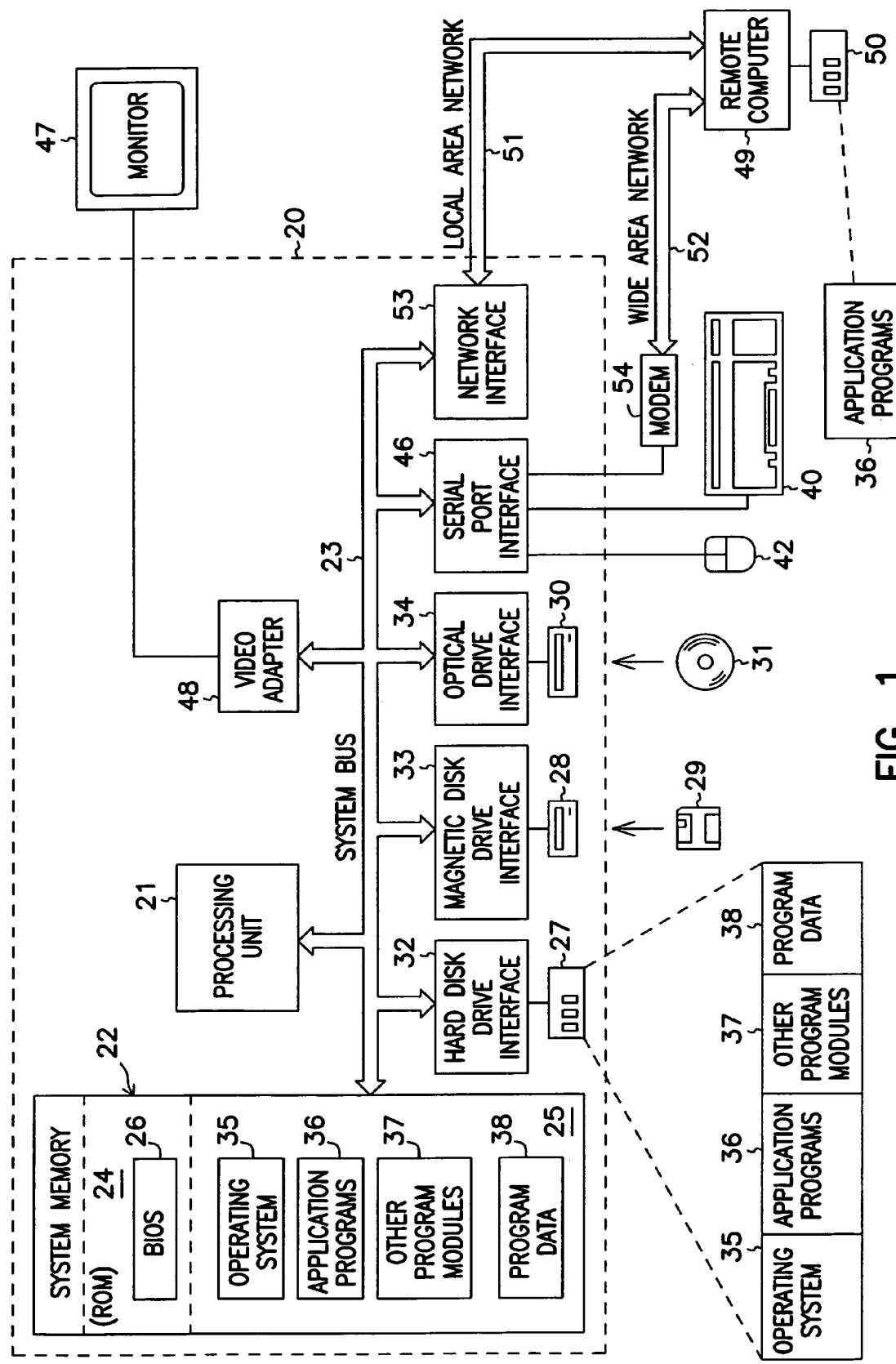
FIG. 1 shows a diagram of the hardware and operating environment in conjunction with which embodiments of the invention may be practiced.

FIG. 1 is a diagram of the hardware and operating environment in conjunction with which embodiments of the invention may be practiced. The description of FIG. 1 is intended to provide a brief, general description of suitable computer hardware and a suitable computing environment in conjunction with which the invention may be implemented. Although not required, the invention is described in the general context of computer-executable instructions, such as program modules, being executed by a computer, such as a personal computer. Generally, program modules include routines, programs, objects, components, data structures, etc., that perform particular tasks or implement particular abstract data types.

Moreover, those skilled in the art will appreciate that the invention may be practiced with other computer system configurations, including hand-held devices, multiprocessor systems, microprocessor-based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices The exemplary hardware and operating environment of FIG. 1 for implementing the invention includes a general purpose computing device in the form of a computer 20, including a processing unit 21, a system memory 22, and a system bus 23 that operatively couples various system components including the system memory to the processing unit 21. There may be only one or there may be more than one processing unit 21, such that the processor of computer 20 comprises a single central-processing unit (CPU), or a plurality of processing units, commonly referred to as a parallel processing environment. The computer 20 may be a conventional computer, a distributed computer, or any other type of computer; the invention is not so limited.

The system bus 23 may be any of several types of bus structures including a memory bus or memory controller, a peripheral bus, and a local bus using any of a variety of bus architectures. The system memory may also be referred to as simply the memory, and includes read only memory (ROM) 24 and random access memory (RAM) 25. a basic input/output system (BIOS) 26, containing the basic routines that help to transfer information between elements within the computer 20, such as during start-up, is stored in ROM 24. The computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated computer-readable media provide nonvolatile storage of computer-readable instructions, data structures, program modules and other data for the computer 20. It should be appreciated by those skilled in the art that any type of computer-readable media which can store data that is accessible by a computer, such as magnetic cassettes, flash memory cards, digital video disks, Bernoulli cartridges, random access memories (RAMs), read only memories (ROMs), and the like, may be used in the exemplary operating environment.

A number of program modules may be stored on the hard disk, magnetic disk 29, optical disk 31, ROM 24, or RAM 25, including an operating system 35, one or more application programs 36, other program modules 37, and program data 38. A user may enter commands and information into the personal computer 20 through input devices such as a keyboard 40 and pointing device 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port, or a universal serial bus (USB). A monitor 47 or other type of display device is also connected to the system bus 23 via an interface, such as a video adapter 48. In addition to the monitor, computers typically include other peripheral output devices (not shown), such as speakers and printers.

The computer 20 may operate in a networked environment using logical connections to one or more remote computers, such as remote computer 49. These logical connections are achieved by a communication device coupled to or a part of the computer 20; the invention is not limited to a particular type of communications device. The remote computer 49 may be another computer, a server, a router, a network PC, a client, a peer device or other common network node, and typically includes many or all of the elements described above relative to the computer 20, although only a memory storage device 50 has been illustrated in FIG. 1. The logical connections depicted in FIG. 1 include a local-area network (LAN) 51 and a wide-area network (WAN) 52. Such networking environments are commonplace in offices, enterprise-wide computer networks, intranets and the Internet.

When used in a LAN-networking environment, the computer 20 is connected to the local network 51 through a network interface or adapter 53, which is one type of communications device. When used in a WAN-networking environment, the computer 20 typically includes a modem 54, a type of communications device, or any other type of communications device for establishing communications over the wide area network 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It is appreciated that the network connections shown are exemplary and other means of and communications devices for establishing a communications link between the computers may be used.

The hardware and operating environment in conjunction with which embodiments of the invention may be practiced has been described. The computer in conjunction with which embodiments of the invention may be practiced may be a conventional computer, a distributed computer, or any other type of computer; the invention is not so limited. Such a computer typically includes one or more processing units as its processor, and a computer-readable medium such as a memory. The computer may also include a communications device such as a network adapter or a modem, so that it is able to communicatively couple other computers.

System Level Overview

Figure 2:
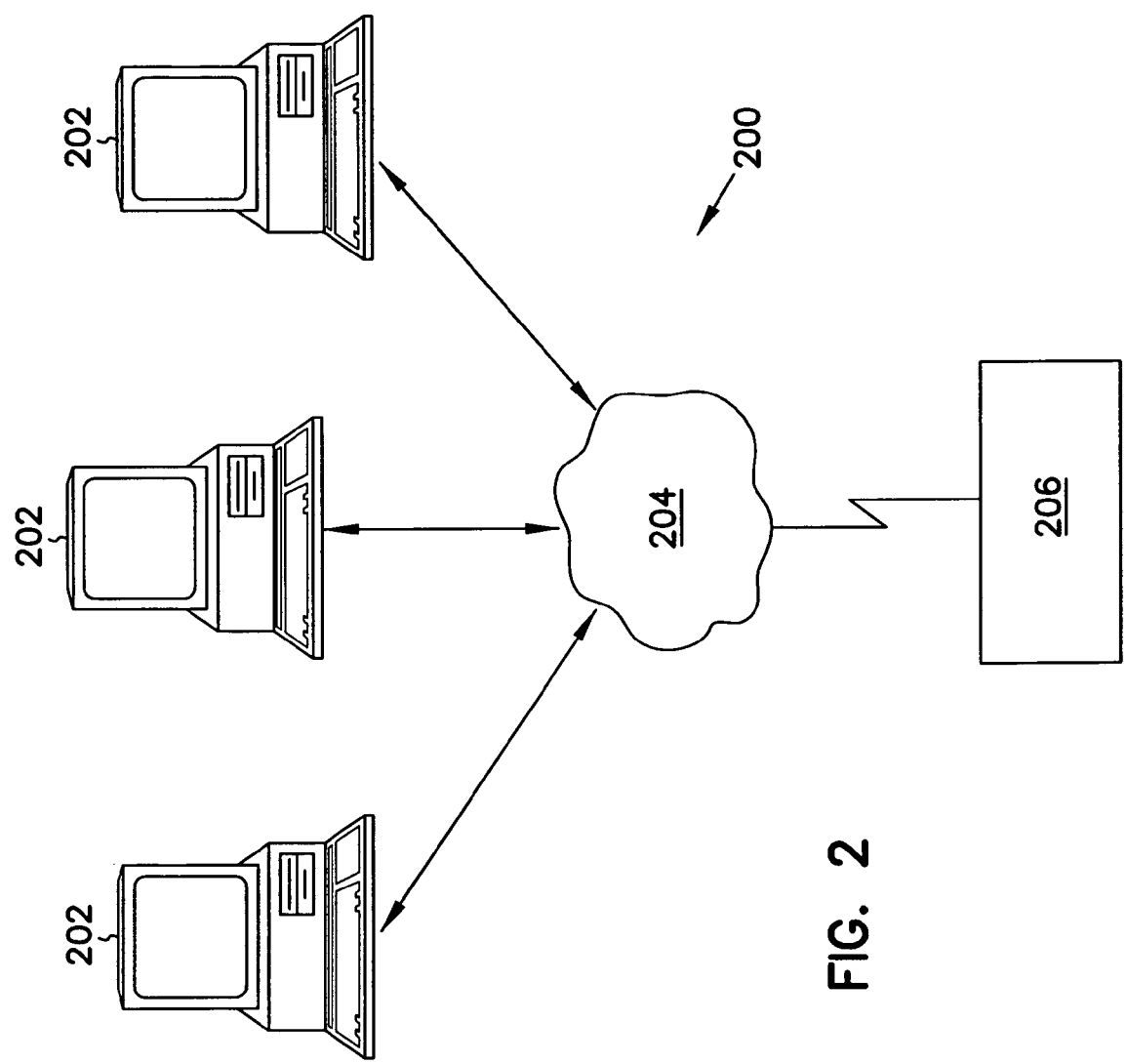
FIG. 2 is a diagram illustrating a system-level overview of an example embodiment of the invention.

FIG. 2 is a diagram illustrating a computing environment 200 in which a scalable computing system manages annotations to a plurality of content sources. The computing environment 200 comprises one or more clients 202, a network 204, and a computing system 206. Each one of the clients 202 is coupled to the computing system 206 through the network 204. The computing system 206 manages annotations associated with a plurality of content sources and presents the annotations to a user of one of the clients 202.

The term "annotation" as used herein refers to any content associated with a document space. In one embodiment the content is a text file, a threaded message, an audio file, a video file, a calendar file or other scheduling information, a chat room or the like. The document space is any document identified with a document identifier (also referred to herein as a "context document identifier"). In one embodiment, the document space is a file identified by either a file name, a directory path or a uniform resource locator (URL) or the like. The document space provides the context for the annotation.

An annotation is implemented as an object with properties. Properties for an example embodiment of an annotation include both generic properties that are common to all annotations and type-specific properties that are unique to a particular type of annotation. Examples of generic annotation properties include type, content, author name, subject, creation time, modify time, time to live, document identifier and parent identifier and the like. The document identifier property identifies the web page or other document that the annotation is associated with. The document identifier property is a link to the document space. The link ties the annotation to the document or documents. The link can be as precise or imprecise as desired by a specific implementation. For example, one annotation might merely link to a URL while another annotation might link to paragraph 3, line 7, word 2 of a URL. An annotation may link to multiple documents as well as to a single document.

Examples of type-specific annotation properties comprise any properties unique to a particular type of annotation. For example, for a chat type annotation, examples of type-specific annotation properties include room name, server, RSACi (Recreational Software Advisory Council on the Internet) rating, description, and the like.

Each one of the clients 202 comprises a user interface to display annotation information. In one embodiment, the user interface displays the annotation information independent of the document to which the annotation is associated. In such an embodiment, annotations are displayed in a manner that is non-intrusive to the original document and a user of client 202 does not require permission to edit the document in order to annotate the document. One example embodiment of such a user interface is a Web browser such as Microsoft's® Internet Explorer brand Web browser that displays annotations to a URL in a separate browser-panel. Another example embodiment of such a user interface is a client application capable of displaying annotations to a URL in a window separate from the Web browser. Still another embodiment of such a user interface is a client application capable of displaying annotations associated with documents from non-Web based application such as a Microsoft® Excel brand spreadsheet or a Microsoft® Word brand text file.

In an alternate embodiment, the user interface displays the annotation information in a manner that incorporates the annotation with the document to which the annotation is associated. In this embodiment, the annotations are displayed in a manner that is intrusive to the original document.

The computing system 206 is based on an architecture that is capable of handling user requests for viewing and posting annotations to millions of documents each day. Even though the computing system 206 handles such large volumes of requests, the architecture of the computing system 206 is optimized to allow for easy and fast access to annotations. In order to handle requests for millions of annotations, the computing system 206 consists of multiple tiers of servers as described in more detail below.

Figure 3:
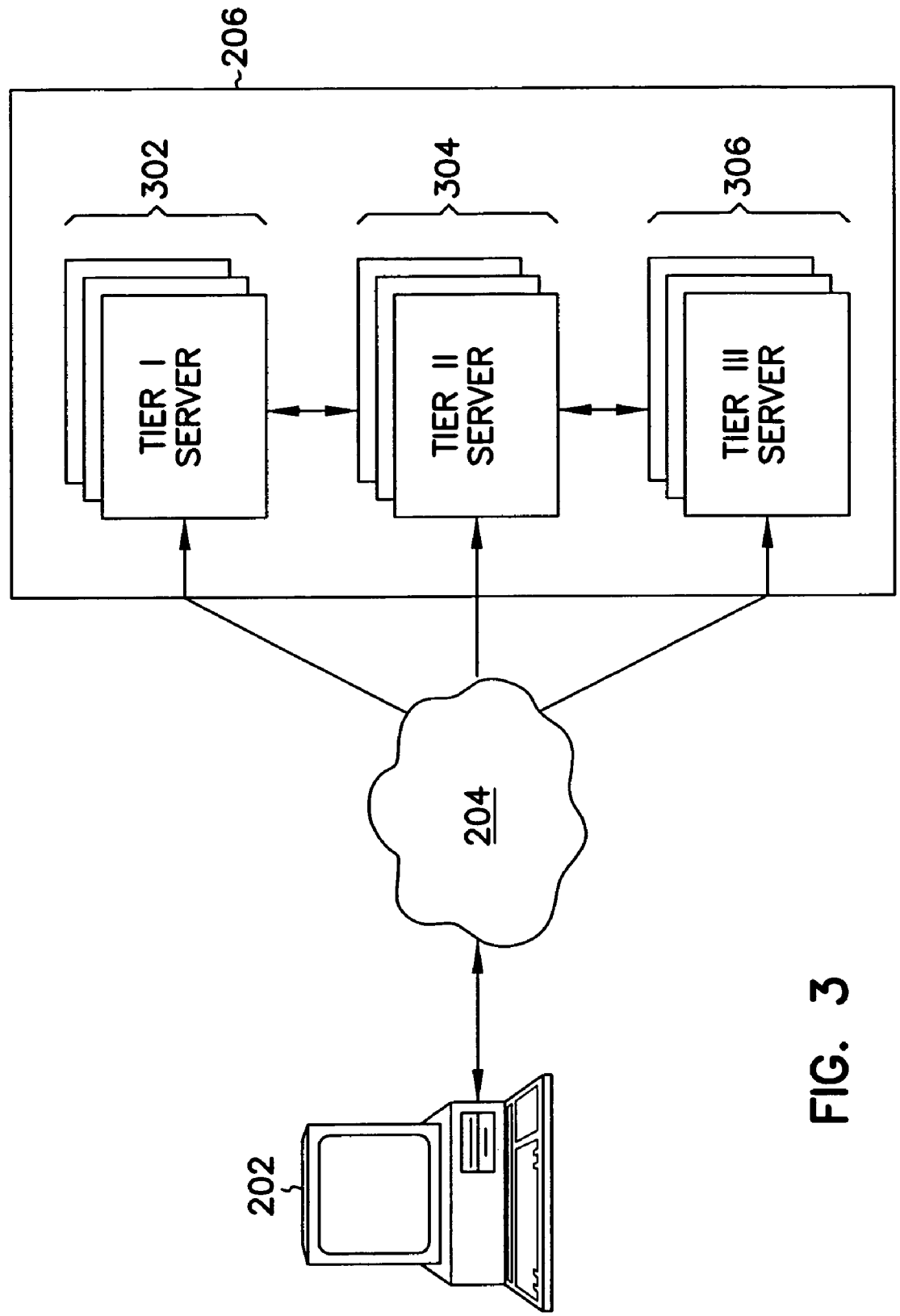
FIG. 3 is a diagram illustrating the components of one embodiment of a computing system for managing annotations to a plurality of content sources.

FIG. 3 is a diagram illustrating the components of one embodiment of the computing system 206 for managing annotations to a plurality of content sources. FIG. 3 comprises a client 202, a network 204 and a computing system 206. In the embodiment shown in FIG. 3, the computing system 206 comprises three tiers of servers.

The client 202 is a computer running any software capable of displaying annotations. The client 202 interacts directly with a first tier, a second tier, and a third tier of the computing system 206.

The first tier of computing system 206 comprises one or more servers collectively referred to herein as a "tier I server" 302. The tier I server 302 indicates to the client 202 whether or not there are annotations associated with a current content source. The client 202 identifies the content source to the tier I server 302 using a document identifier. An example document identifier is a URL (Uniform Resource Locator) which provides an address for documents on the World Wide Web.

The tier I server 302 handles a large number of requests per second from clients, such as the client 202, and as a result must respond to the requests as fast as possible. If the tier I server 302 determines that there are no associations for the document identifier then the client request is answered with a response of "no associations." Therefore, one role of the tier I server 302 is to quickly respond to the client 202 when there are no associations and thus prevent further queries to the tier II server 304 and tier III server 306 of computing system 206. Another role of the tier I server 302 is to quickly respond to the client 202 when annotations are associated with a document. In this role the tier I server 302 responds td the client with information that allows the client to retrieve an index of annotations associated with the document from the tier II server 304. The tier I server 302 also interacts directly with the tier II server 304 during the process of posting annotations as described in more detail below.

The second tier of computing system 206 comprises one or more servers collectively referred to herein as a "tier II server" 304. The tier II server 304 contains indices for the content of all annotations. The client 202 is directed to the tier II server 304 by the tier I server 302. The client 202 communicates directly with the tier II server 304. The index maintained by the tier II server 304 is used to refer the client 202 to the tier III server 306 storing the actual annotation content. The tier II server 304 also interacts directly with the tier I server 302 and the tier III server 306 during the process of posting annotations as described in more detail below.

The third tier of computing system 206 comprises one or more servers collectively referred to herein as a "tier III server" 306. The tier III server 306 stores actual annotation content. The client 202 is directed to the tier III server 306 by the tier II server 304. The client 202 communicates directly with the tier III server 306. The tier III server 306 provides a way to individually address each annotation in the tier III server data store. The client 202 uses this addressing mechanism along with the tier II server indices to retrieve annotation content. One function of the tier III server 306 is to store the annotation body and all of the annotation properties that are not stored by the tier II server 304 (such as the annotation properties that are unique to a particular type of annotation). Each tier III server 306 can store a single type of annotation or multiple types of annotations. Another function of the tier III server 306 is to accept new annotation posts from the client 202 and to begin the process of posting the annotation data to all three tiers of the computing system 206 accordingly. The tier III server 306 interacts directly with the tier II server 304 and the client 202 during the process of posting annotations as described in more detail below.

A system level overview of a scalable computing system that manages annotations associated with a plurality of content sources has been described in this section of the detailed description. The computing system is optimized to allow for easy and fast access to annotations. One feature of the computing system that allows for easy and fast access is that annotations are posted to the tiers of the computing system in the opposite direction as the annotations are accessed by a user viewing an annotation.

The following sections describe an example embodiment of the invention in which the annotated content source (also referred to as the "context" for the annotation) is a Web document and the document identifier is a URL. However, the invention is not so limited and annotations can be associated with any document space as further described in the co-filed and co-assigned application entitled "Associating Annotations with a Content Source". Also, in the example embodiment the annotations are indexed by community for purposes of categorization and ease of user navigation and management. Indexing by community adds extra contextual properties to the annotations, which in turns adds to the usefulness and manageability for the user—especially in computing systems managing millions of annotations. Again, the invention is not so limited and alternate embodiments are contemplated using additional or differing indexing mechanisms such as type, subject or creation date, for example.

Tier I Server

Figure 4A:
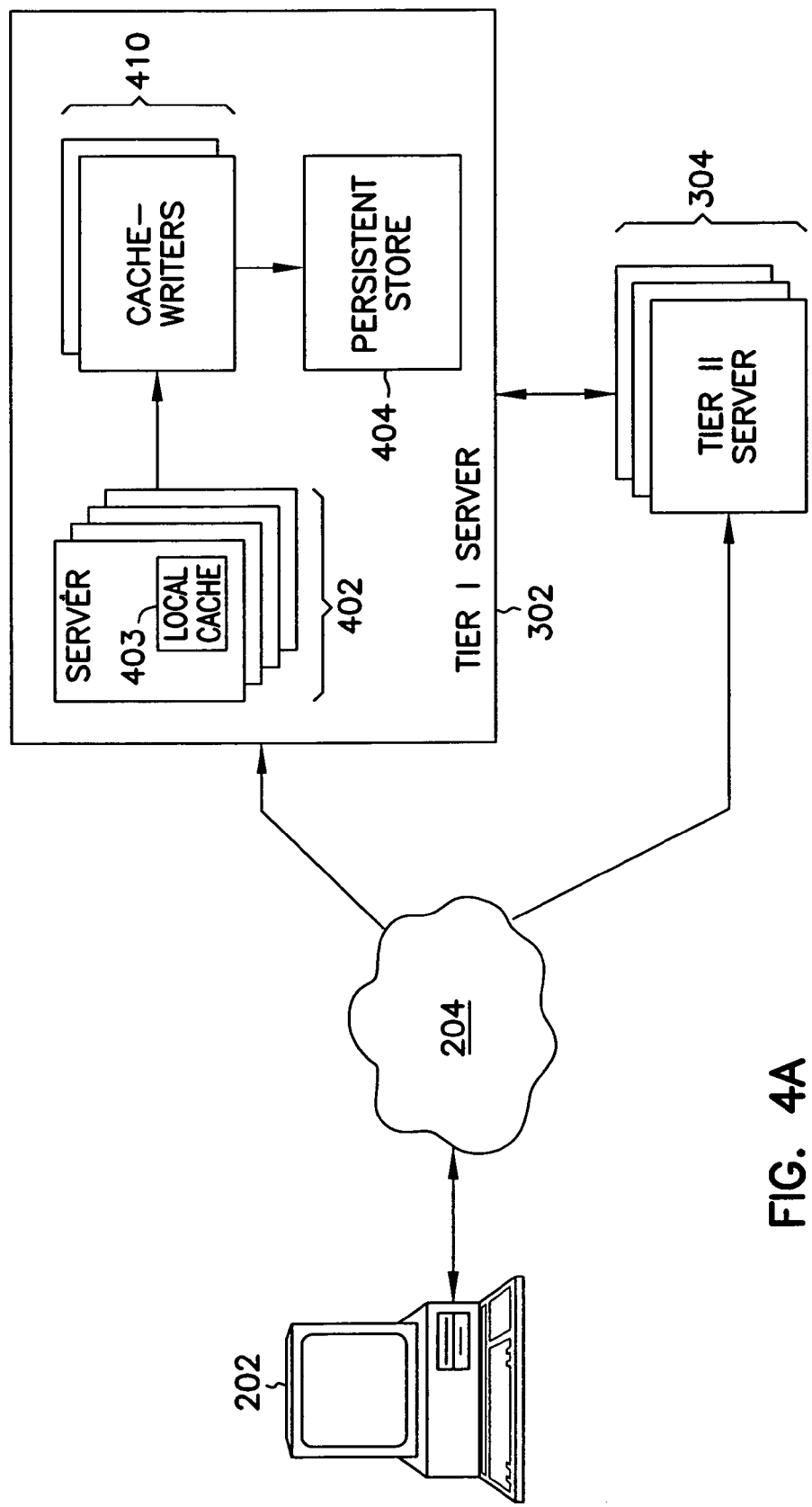
FIGS. 4A and 4B are more detailed diagrams illustrating example embodiments of the tier I server shown in FIG. 3.
Figure 4B:
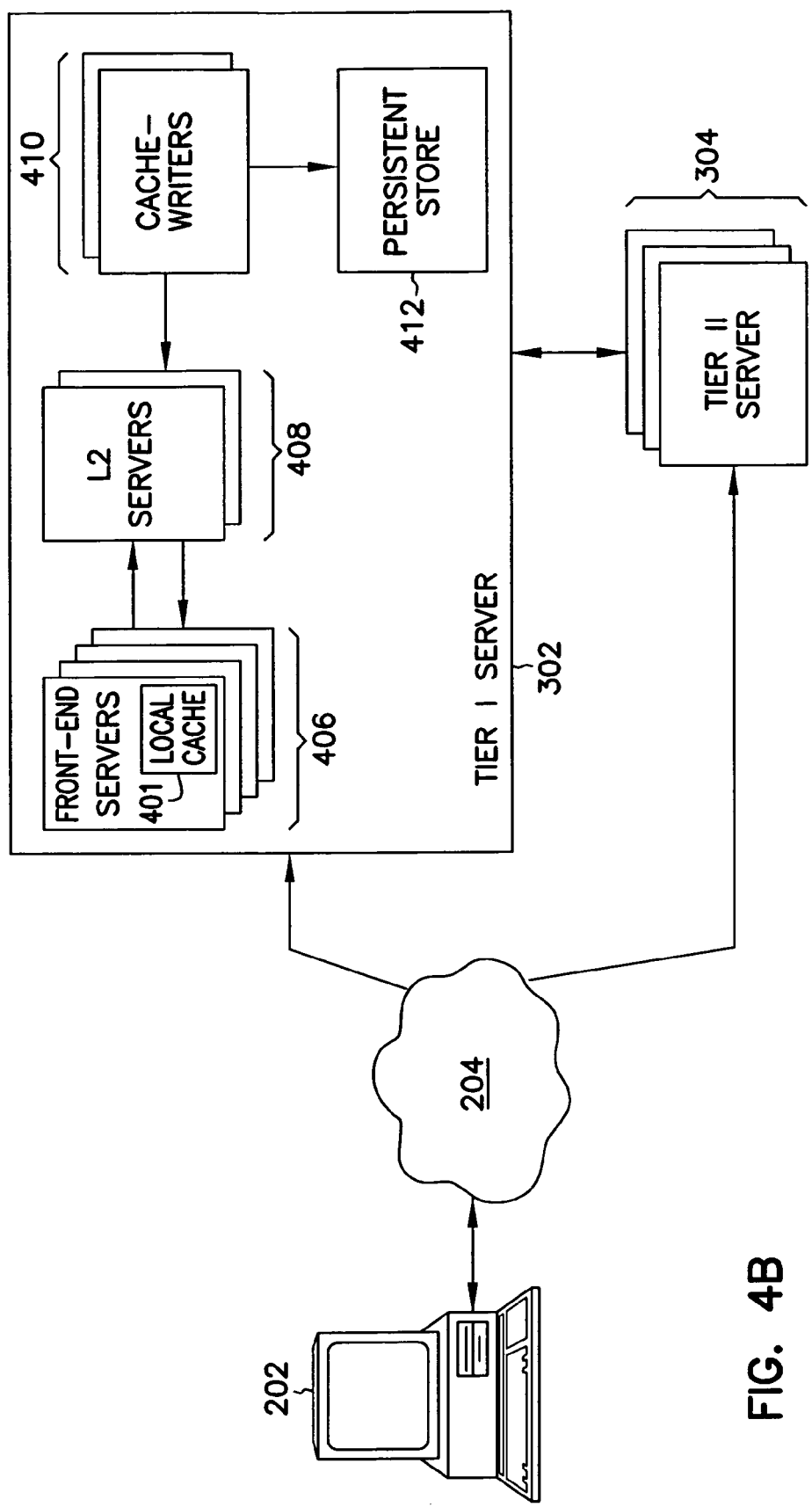

FIGS. 4A and 4B are diagrams illustrating example embodiments of the tier I server 302 for indicating to a client whether or not there are annotations associated with a document that is identified by a URL. The tier I server 302 checks for annotations associated with a specified URL and returns a response to the client 202 indicating whether or not there are annotations associated with the document identified by the URL. If annotations are associated with the document, the tier I server 302 also returns information to the client 202 which includes the tier II server 304 that indexes the annotations. The topology, implementation, and posting process for two example embodiments of the tier I server 302 are further described below.

Topology. In the example embodiment shown in FIG. 4A, the tier I server comprises a cluster of servers 402, one or more cache writers 410, and one or more persistent data stores 404. The cluster of servers 402 receives and responds to requests from the client 202 through network 204. Each one of the servers 402 has a local cache 403 for quickly retrieving annotation data. The annotation data is entirely stored in the local cache 403 of each one of the servers 402. Storing all of the annotation data in the local cache of each one of the servers 402 allows the tier I server to respond quickly a request for annotations. In one embodiment, each one of the servers 402 is implemented using an Internet Server Application Programming Interface (ISAPI) DLL. The persistent data store 404 maintains the annotation data. In one embodiment, the persistent data store 404 is a Microsoft® SQL server.

In an alternate example embodiment shown in FIG. 4B, the tier I server 302 comprises a cluster of front-end servers 406, a cluster of second-level (L2) cache servers 408, one or more cache writers 410, and one or more persistent data stores 412. The front-end servers 406 receive and respond to requests from the client 202 through network 204. Each one of the front-end servers 406 has a local first-level (L1) cache 401 for quickly retrieving annotation data. In one embodiment, each one of the front-end servers 406 is implemented using an Internet Server Application Programming Interface (ISAPI) DLL. Each of the L2 cache servers 408 functions as a secondary cache and each of the L2 cache servers 408 is available to all of the front-end servers 406. The L2 cache servers 408 partition the annotation data across any desired number of L2 cache servers 408. In one example, a hashing function is defined at the local cache level of the tier I server such that the local cache 401 of the tier I server knows which L2 cache server 408 is storing the annotation data if an annotation exists. The example embodiment shown in FIG. 4B is commonly used when the annotation data is too large to be entirely stored in the local cache 401 of each one of the front-end servers 406.

The persistent data stores 412 maintain a redundant copy of the annotation data that is kept in memory on the L2 cache servers 408. The persistent data stores 412 are used for initialization of the L2 cache servers 408. In one embodiment, the persistent data stores 412 are Microsoft® SQL servers. The cache-writers 410 update the L2 cache servers 408 and the persistent data stores 412 with data received for the tier II server 304 as further described below with respect to posting an annotation. Alternatively, in the example shown in FIG. 4A, the cache writers 410 write directly to the local cache (L1) 403. The cache writer can write to either a L1 or a L2 cache. In one embodiment, the cache-writers 410 are servers running messaging queue software such as Microsoft® Message Queue (MSMQ).

In the embodiments in both FIGS. 4A and 4B, a round-robin scheme is used to distribute client requests across the cluster of servers 402, 406 for the purposes of load distribution.

Implementation. In the example embodiment shown in FIG. 4A, when the tier I server 302 receives a request from the client 202, the server 402 receiving the request checks its local first-level (L1) cache 403. If the L1 cache indicates an annotation is associated with the URL, then the tier I server 302 immediately responds to the client 202 with the annotation entry from the L1 cache which includes references to the tier II server 304 for further annotation indexing. If no annotations are found in the L1 cache 403, then there are no annotations associated with the URL in the client's request and the client request is answered with a response of "no associations" or the like. By storing all of the annotation data in the local L1 cache 403 of each server 402, the implementation in FIG. 4A is optimized to respond quickly to millions of requests for annotations each day.

In an alternate example embodiment shown in FIG. 4B, the tier I server 302 implements a distributed caching scheme in which all the annotation data is kept in memory. When the tier I server 302 receives a request from the client 202, the front-end servers 406 first check their local first-level (L1) cache 401. If the L1 cache 401 indicates an annotation is associated with the URL, then the tier I server 302 immediately responds to the client 202 with the annotation entry from the L1 cache 401 which includes references to the tier II server 304 for further annotation indexing. If the L1 cache 401 does not indicate an annotation is associated with the URL, then the second-level (L2) cache servers 408 are checked. If no annotations are found on the L2 cache servers 408, then there are no annotations associated with the URL in the client's request and the client request is answered with a response of "no associations" or the like. If an annotation is found on the L2 cache server 408, then the tier I server 302 immediately responds to the client 202 with the annotation entry from the L2 cache server 408 and the annotation entry is added to the requesting front-end server's 406 L1 cache according to a most recently used (MRU) algorithm. In an alternate embodiment, the L1 cache 401 of all tier I servers is updated when the annotation is found on the L2 cache server 408. In one embodiment, the distributed cache shown in FIG. 4B uses hash tables internally for quick lookups. The URL or other document identifier is the key for the hash table in both the L1 cache and L2 cache. In one embodiment, each cache entry's data represents all categories that are associated with the URL key.

In the example embodiment shown in FIG. 4B, each individual L1 cache 401 is pre-populated upon initialization using some number of popular associations from the persistent SQL server 412. Each server in the L2 cache 408 has a redundant mirror server for fail-over and for quick recovery of the failed server. In the event an L2 cache server 408 fails, its fail-over server will take its place. When the failed L2 cache server 408 comes back on line, it will use its replacement server to resynchronize and it will either take its place again as the primary server or assume the fail-over server role. All L2 servers 408 serve as fail-over servers for each other.

In the example embodiments of both FIGS. 4A and 4B, the tier I server is easily scaled to handle more client requests by adding additional servers 402, 406. Because the requests from the client 202 are cycled through the available servers 402, 406, adding additional servers will increase the number of clients that can be processed. Alternatively, adding additional processors to each server 402, 406 allows easy scalability.

As described above, the tier I server 302 is optimized to support fast response times by quickly responding to the client requests when there are no associations and thus preventing further queries to the computing system 206. The tier I server 302 also supports fast response times when annotations are associated with a content source by returning information that allows the client 202 to retrieve an index of annotations from the tier II server rather than returning the content all of the annotations associated with the document.

Posting. The tier I server 302 is the last component of computing system 206 shown in FIG. 3 to be notified of an annotation post. In the embodiment shown in FIG. 4A, the cache writer servers 410 of the tier I server 302 provide a post-acceptor. A post acceptor is a software component that accepts and processes annotation posts. Once an annotation post reaches the tier I server 302 of the computing system 206 (via the tier II server 304), the post consists of information identifying the URL or other document identifier that the annotation is associated with. The post-acceptor accepts posts from the tier II server 304 and adds the posts to a cache-writer's message queue.

The cache writer is responsible for handling the tier I server portion of the annotation post process. The cache-writer servers update the L1 cache 403 on each one of the servers 402. Each cache-writer runs messaging software. When the post-acceptor receives a post, it adds a message to one of the cache-writer's message queues including the properties of the post. Then the post-acceptor notifies the sender of the post (the tier II server 304) that the tier I server 302 successfully received the post. When the cache-writer processes the message in its queue, it adds the post properties in the message to the L1 cache 403 of each one of the servers 402 if the entry does not already exist in the L1 cache 403. The cache-writer also updates the persistent data store 404. In one embodiment, the cache-writer process posts messages in batches for efficient, fast updates to the persistent data store 404. In one embodiment, the act of writing to the L1 cache 403 of the server 402 and to the persistent data store 404 happen together to maintain the reliability of the annotation data. Thus, to post an annotation in the embodiment shown in FIG. 4A, the tier II server 304 pushes data into the L1 cache of each one of the servers 402 and into the persistent store 404 via the cache-writers 410.

In the embodiment shown in FIG. 4B, the cache writer 410 is responsible for updating the appropriate L2 cache server 408. This differs from the example embodiment in FIG. 4A in which the cache-writer updates each one of the L1 caches 403. In the embodiment in FIG. 4B the annotation data is partitioned across the L2 servers and the cache-writer updates the appropriate L2 cache server 408 rather than all of the L2 caches servers 408. The cache-writer also updates the persistent data store 412. Thus, to post an annotation in the embodiment shown in FIG. 4B, the tier II server 304 pushes the data into the appropriate L2 cache server 408 and into the persistent data store 412 via the cache-writers 410.

Tier II Server

Figure 5:
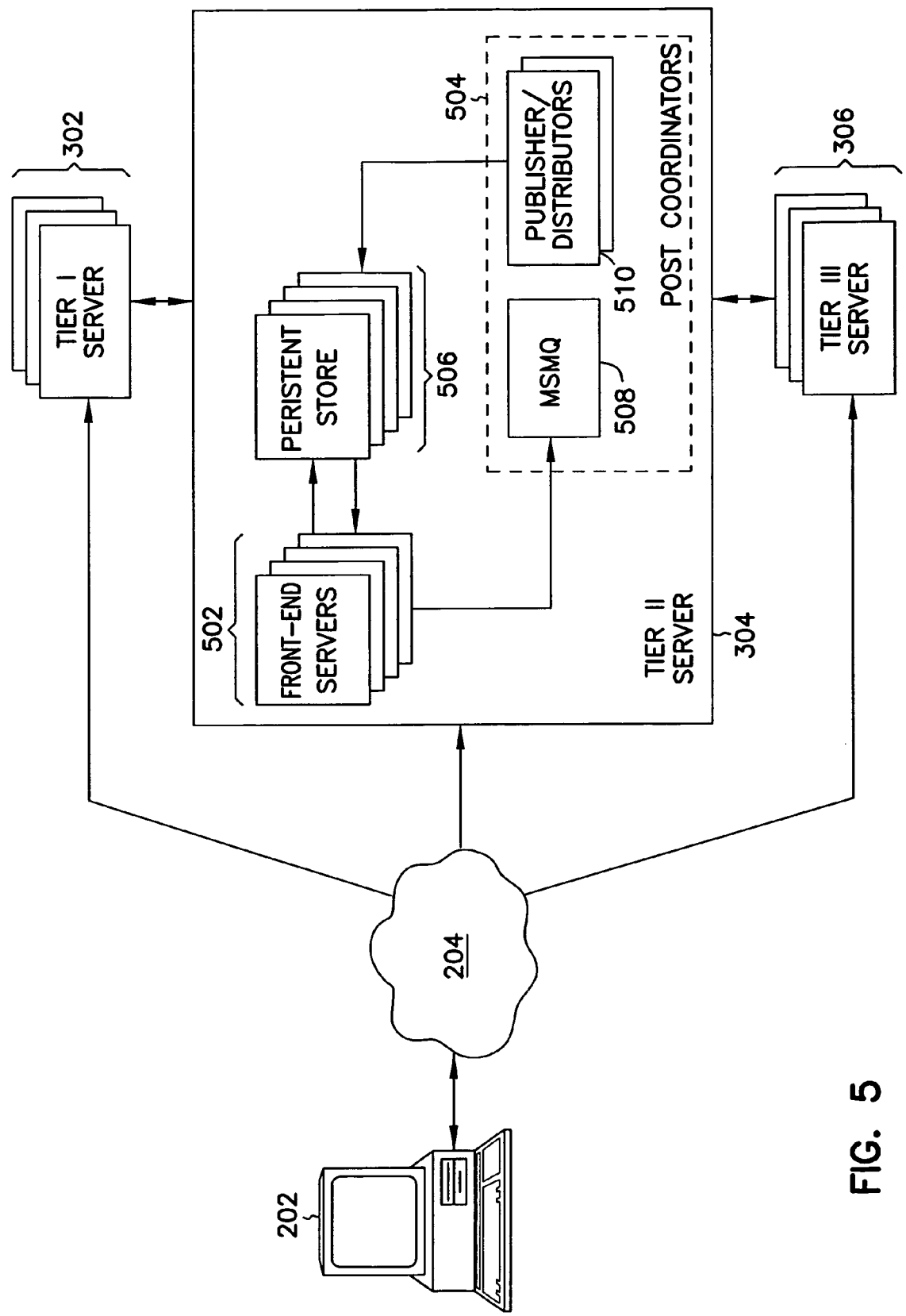
FIG. 5 is a more detailed diagram illustrating an example embodiment of the tier II server shown in FIG. 3.

FIG. 5 is a diagram illustrating an example embodiment of the tier II server 304 for indexing the actual annotation body and for storing generic properties for the annotation. Associations can be sorted and indexed in any manner that makes them more usable to a user. In the example embodiment, the annotations are indexed by community. A community is a virtual and dynamic association of users. Communities and a computing system for managing communities are described in more detail in the co-filed and co-assigned application "Computing System for Managing Dynamic Communities."Application Ser. No. 09/339,635, filed Jun. 24, 1999, now U.S. Pat. No. 6,581,096, titled "Scalable Computing System for Managing Dynamic Communities in Multiple Tier Computing System."

The tier II server 304 receives fewer requests from the client 202 than the tier I server 302. However, the tier II server 304 provides responses to the client 202 that contain more data than the responses to the client 202 from the tier I server 302. The topology, implementation, and posting process for an example embodiment of the tier II server 304 are further described below.

Topology. In the example embodiment shown in FIG. 5, the tier II server 304 comprises a cluster of front-end servers 502, one or more post coordinators 504, and one or more persistent data stores 506. The front-end servers 502 receive and respond to requests from the client 202 through network 204. Each one of the front-end servers 502 is capable of handling any client request. A round-robin scheme is used to distribute client requests across the front-end servers 502. In one embodiment, each one of the front-end servers 502 executes Microsoft's® Internet Information Server (IIS) on a Windows NT operating system. Each one of the front-end servers 502 has a local cache to store annotation data. The post coordinators 504 comprise a messaging queue server 508 such as Microsoft®Message Queue (MSMQ) and a publisher/distributor 510 that makes data available to subscribing servers. The persistent data stores 506 maintain a copy of the annotation data and subscribe to the publisher/distributor. Each one of the persistent data stores 506 maintains equivalent data. In one embodiment, the persistent data stores 506 are Microsoft® SQL servers.

Implementation. The tier II server 304 serves as an annotation index to the actual annotation data as well as stores generic annotation properties. The client 202 makes a request to the tier II server 304 to enumerate annotations identified in the response to the client from the tier I server 302. The request to the tier II server includes the document identifier. Other properties may be included to modify the request as desired. In one embodiment, when the tier II server 304 receives a request from the client 202, the front-end server 502 receiving the request retrieves the requested information from the persistent data store 506.

The tier II server is easily scaled to handle more client requests by adding additional front-end servers 502. Because the requests from the client 202 are cycled through the available front-end servers 502, adding additional servers will increase the number of client requests processed. However, merely increasing the front-end servers 502 will increase the load on the persistent data stores 506. Therefore, to increase response time, the increase in the number of front-end servers 502 is balanced by increasing the number of persistent data stores 506.

Posting. The tier II server 304 is the second component of the computing system 206 shown in FIG. 3 to be notified of an annotation post. Once an annotation post reaches the tier II server tier of the computing system 206 (via the tier III server 306), the post consists of a number of general properties common to all annotations. The post also includes a unique way to identify and reference the annotation on the tier III server 306 that stores the actual content of the annotation.

In the example embodiment shown in FIG. 5, the post coordinator 504 accepts posts from the tier III server 306 and adds the posts to the tier II server post message queue 508. In one embodiment, the post message-queue is a MSMQ server 508 that reliably writes annotations into an SQL store 506 using a publisher-distributor-subscriber model. Then the post coordinator 504 notifies the sender of the post (the tier III server 306) that the tier II server 304 successfully received the post. When the message queue server 508 processes the message in its queue, it inserts the post properties in the message into the SQL store 506. In one embodiment, the message queue server batches post queue messages together for efficient, fast SQL writes. The tier II server 304 updates the SQL annotation element store with the new annotation and stores the tier III server-provided reference to the tier III server-stored annotation.

Tier III Server

Figure 6:
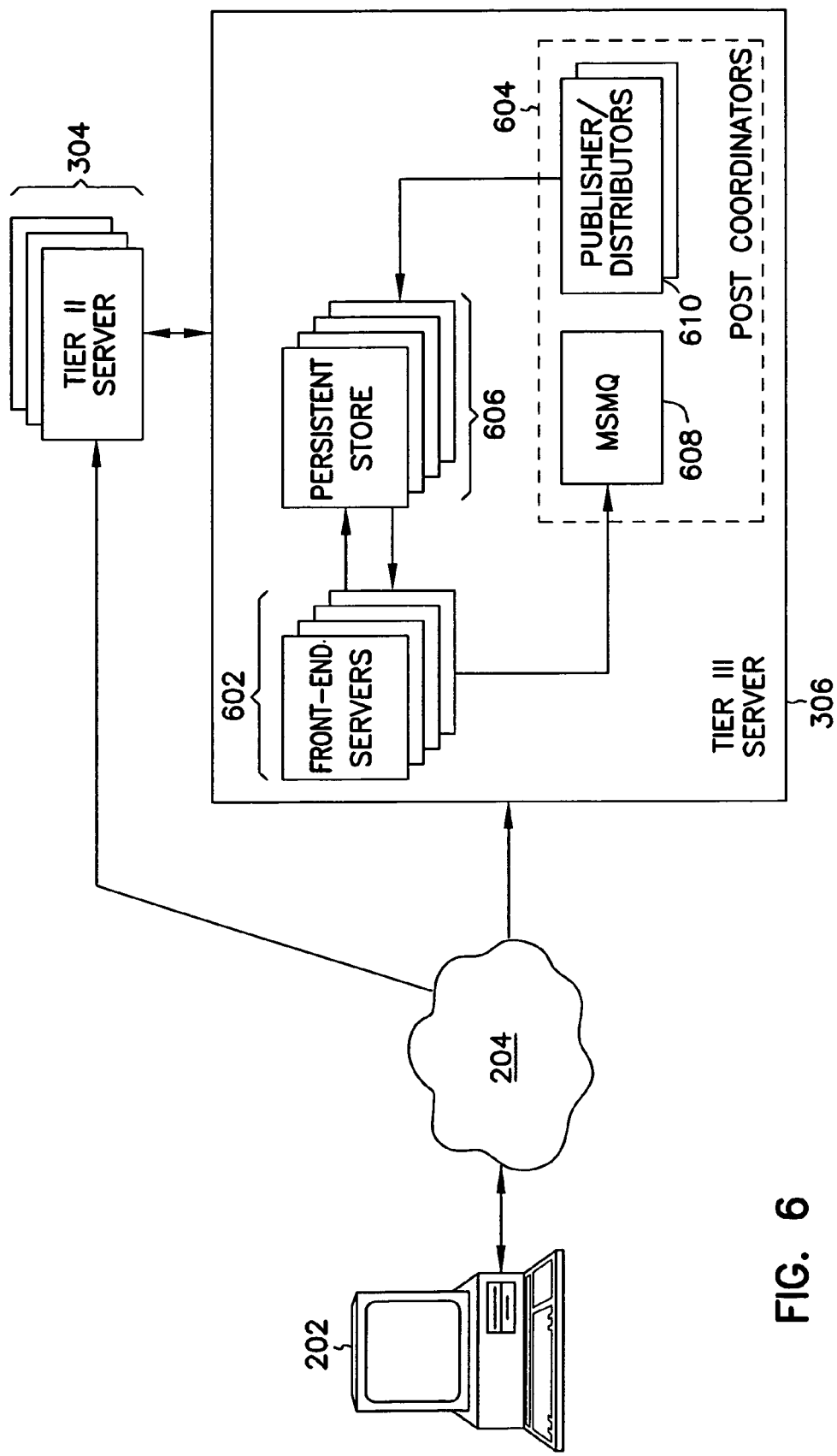
FIG. 6 is a more detailed diagram illustrating an example embodiment of the tier III server shown in FIG. 3.

FIG. 6 is a diagram illustrating an example embodiment of the tier III server 306 for storing the actual body of the annotation and type-specific properties of the annotation. The tier III server 306 receives fewer requests from the client 202 than the tier II server 304 receives from the client 202. However, the size of the responses provided by the tier III server 306 vary significantly depending on the type of annotation being retrieved. For example, for an annotation that is a message thread, the tier III server stores and retrieves the text of the messages. For an annotation that is a file, the tier II server 306 stores and retrieves the actual file. For an annotation that is a chat, the tier III server 306 functions as the chat server and so on. The topology, implementation, and posting process for an example embodiment of the tier III server 306 are further described below.

Topology. In the example embodiment shown in FIG. 6, the tier III server 306 comprises a cluster of front-end servers 602, one or more post coordinators 604, and one or more persistent data stores 606. The front-end servers 602 receive and respond to requests from the client 202 through network 204. Each front-end server 602 is capable of handling any client request. A round-robin scheme is used to distribute client requests across the front-end servers 602. In one embodiment, each one of the front-end servers 602 executes Microsoft's®D Internet Information Server (IIS) on a Windows NT® operating system. The post coordinators 604 comprise a messaging server 608 such as Microsoft® Message Queue (MSMQ) and a publisher/distributor 610 that makes data available to subscribing servers. The persistent data stores 606 maintain a copy of the body of each one of the annotations and subscribe to the publisher/distributor. The persistent data stores 606 are partitioned and thus each one to the persistent data stores contain different annotation content. In one embodiment, the persistent data stores 606 are Microsoft® SQL servers.

Implementation. The tier III server 306 stores and provides access to annotation-specific properties and to the body of each one of the annotations. In one embodiment, when the tier III server 306 receives a request from the client 202, the front-end server 602 receiving the request retrieves the requested information from the persistent data store 606. The tier III server 306 can be implemented to store a single type of annotation or multiple types of annotations.

Because the size of the responses provided by the tier III server 306 vary significantly depending on the type of annotation being retrieved, the number of transactions per second handled by the tier III server 306 is less a function of retrieval times and more a function of retrieval and transmission times. The tier III server 306 is scalable by changing two variables: the number of front-end servers 602 and the number of persistent data stores 606. Increasing the number of front-end servers 602 will increase the number of client requests that can be received because the requests are cycled through the available front-end servers 602. However, for delays caused by slow retrieval from the persistent data stores 606, additional persistent data stores 606 as well as additional front-end servers 602 are required. The reasoning being that if responses to clients 202 are delayed because the persistent data stores 606 are slow, then the additional client requests will build up on the front-end servers 602 because without additional front-end servers 602 nothing is working to decrease the client request queue. In this manner, the tier III server 306 is scalable and thus is capable of providing high transaction rates and fast response times.

The computing system 206 is further scalable by providing support for external clusters of tier III servers. This feature provides a "plug-in" point for another party's content stores containing different, unsupported, or unknown annotation types. Such external clusters of tier III servers are referred to herein as "pluggable content servers." The client 202 uses MIME (Multi-Purpose Internet Mail Extensions) information or some other type specifier to identity the annotation type from the pluggable content servers and to select the appropriate viewer or player for the annotation type. In some cases the viewer or player is already present on the client 202. In other cases, the viewer or player needed for the annotation type is not present on the client 202. When the viewer or player needed is not present on the client 202, the tier III server sends to the client 202 both the annotation data and client software that enables a user to display or play the annotation.

Posting. The tier III server 306 is the first server component to be notified of an annotation post. The client 202 interacts directly with the tier III server 306 to post an annotation. Upon receiving an annotation post from the client 202, the tier III server 306 updates the persistent data store 606 with the new annotation. The tier III server 306 stores the client-provided type-specific properties and generates a unique identifier for the new annotation. Each tier III server front-end server 602 has a post-acceptor. When the tier III server 306 receives a post, the post contains more properties than the tier III server 306 stores. The post-acceptor takes the entire post message and adds it to the tier III server post message queue 608 for processing. Once the post message is successfully added to the message queue, the post-acceptor notifies the client 202 that it successfully received the post. When the message-queue server processes the message in its queue, it inserts the tier III server-specific post properties of the message into the persistent data store 606. In one embodiment, the tier III server 306 batch processes post queue messages together for efficient fast writes to the data store. Once the write to the data store is complete and successful, the message queue server 608 modifies the message by removing properties it wrote and adding a unique annotation identifier. Then the message-queue server 608 relays the message to the tier II server URL indicated by the client.

A scalable architecture capable of handling user requests for annotations to millions of documents each day has been described. An example embodiment comprising a tier I server, a tier II server, and a tier III server supports a large volume of requests while at the same time maintains fast response times. However, one of ordinary skill in the art will appreciate that different arrangements of the servers comprising each of the three tiers are contemplated as within the scope of the invention. Alternately, each tier of the scalable architecture can contain multiple clusters of servers and the clusters of servers for each tier may be located in different geographic regions. Furthermore, as the number of annotations grows, a fourth tier of servers may be added to the computing system. In still another embodiment, the architecture can be scaled down to operate as a single tier (and even as a single server) for use in an intranet environment.

Methods of an Exemplary Embodiment of the Invention

Figure 7:
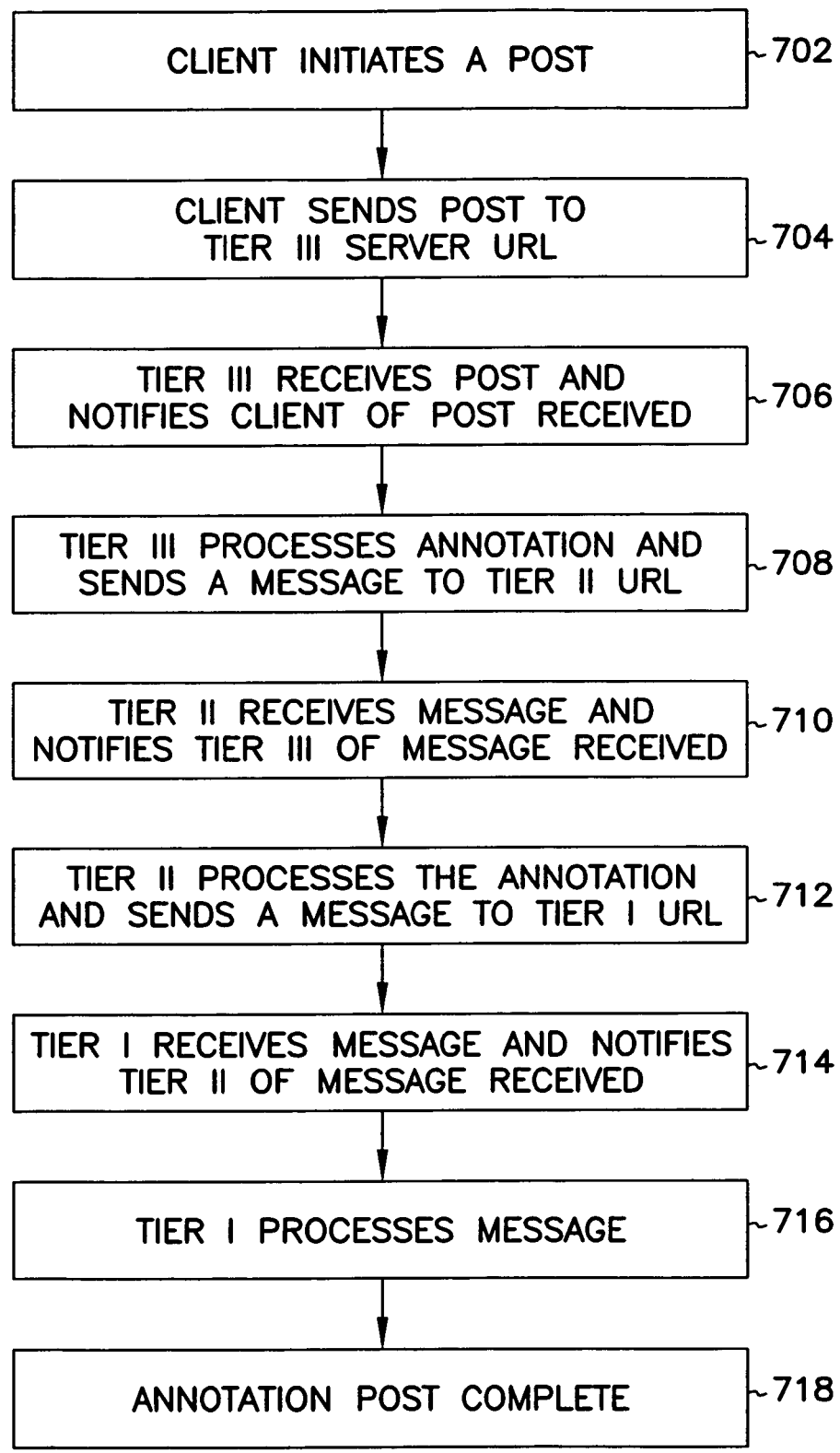
FIG. 7 is a flowchart of a method of posting an annotation according to an example embodiment of the invention.

In this section, a particular method performed by a processor, such as processing unit 21 of FIG. 1, in an exemplary embodiment is described by reference to a flowchart. The method to be performed constitutes computer programs made up of computer-executable instructions. The method shown in FIG. 7 is implemented in a machine readable medium comprising machine readable instructions for causing a computer to perform the method. Such machine readable medium may include software modules and computer programs. The computer programs comprise multiple modules or objects to perform the method. The type of computer programming languages used to write the code may vary from procedural code type languages to object oriented languages. The files or objects need not have a one to one correspondence to the modules or method steps described depending on the desires of the programmer. Further, the method and apparatus may comprise combinations of software, hardware and firmware as is well known to those skilled in the art. Describing the method by reference to a flowchart enables one skilled in the art to develop such programs including such instructions to carry out the methods on suitable computerized systems.

FIG. 7 is a flowchart of a method of posting an annotation. When an annotation is posted by a client, the tier III server, the tier II server and the tier I server are updated in that order.

As shown in FIG. 7, a user of a client computer system ("client") initiates a post of an annotation through a post user interface running on the client (block 702). When the client initiates the post, the client knows the URLs of the tier I server, the tier II server and the tier III server that the client is currently using. The client sends a message to the tier III server URL (block 704). This message constitutes an annotation post, and in one embodiment consists of the following:

Tier I Server URL
Tier II Server URL
Tier III Server URL
Context document identifier
Annotation properties (generic and type-specific)
Annotation data (the "body" of the annotation).

The tier III server post-acceptor (also referred to herein as a post coordinator) receives this message and adds the message to its message queue. After successfully adding the message to the message queue, the tier III server notifies the client that the post has been received (block 706). In one embodiment, after the client is notified by the tier III server that the post is received, no further interaction between the client and the servers takes place during the posting process. The tier III server message queue processes the message. In one embodiment, the tier III server removes the annotation body and type-specific annotation properties and stores them on the tier III server. When storage is successful and complete, a unique identifier is produced for the annotation body and the annotation type-specific properties stored on the tier III server. This unique tier III server annotation identifier is added to the smaller post message, and the smaller post message is relayed to the tier II server URL as specified by the client in its post (block 708).

The tier II server post-acceptor (also referred to herein as a post coordinator) receives this message and adds the message to its message queue. After successfully adding the message to the message queue, the tier II server notifies the tier III server that the post has been received (block 710). After the tier III server is notified by the tier II server that the post is received, no further interaction takes place between the tier II server and the tier III server. The tier II server message queue processes the message. The tier II server removes the portions of the annotation post that the tier II server will store. In one embodiment, the tier II server stores the generic annotation properties and the unique tier III server annotation identifier. The tier II server constructs a tier I server post, which consists of the portions of the annotation post tracked by the tier I server. In one embodiment, the tier I server tracks the context document identifier (i.e., a reference to the annotated document) and the tier II server URL. The tier II server relays this post message to the tier I server post acceptor as specified by the client in its post (block 712).

The tier I server post-acceptor (also referred to herein as a post coordinator) receives this message and adds a message to its message queue. After successfully adding to the message queue, the tier I server notifies the tier II server that the post has been received (block 714). After the tier II server is notified by the tier I server that the post is received, no further interaction takes place between the tier II server and the tier I server. The tier I server message queue processes the message (block 716). After the message is processed by the tier I server, the annotation post process is complete (block 718).

At each stage of the posting process, a retry/fail policy is implemented. If a message queue fails to successfully process the message after some predetermined period of time, then the message is added to a lower-priority queue. This queue is processed less frequently. If the message fails to be successfully processed in the lower-priority queue after some predetermined period of time, then the message will be added to an exception queue where it is manually processed.

The method of posting an annotation show in FIG. 7 offers several advantages. The method provides a fast response to the client. The client receives a response after the message is received by the tier III server rather than waiting until all servers are updated. The method ensures that the annotation will not be accessed by a client until the post is fully completed (since the annotation is not present on the tier I server until the post is complete). The method only transfers the potentially large annotation body once. The annotation body is only transferred from the client to the tier III server where the annotation body is stored.

Data Structures

Figure 8:
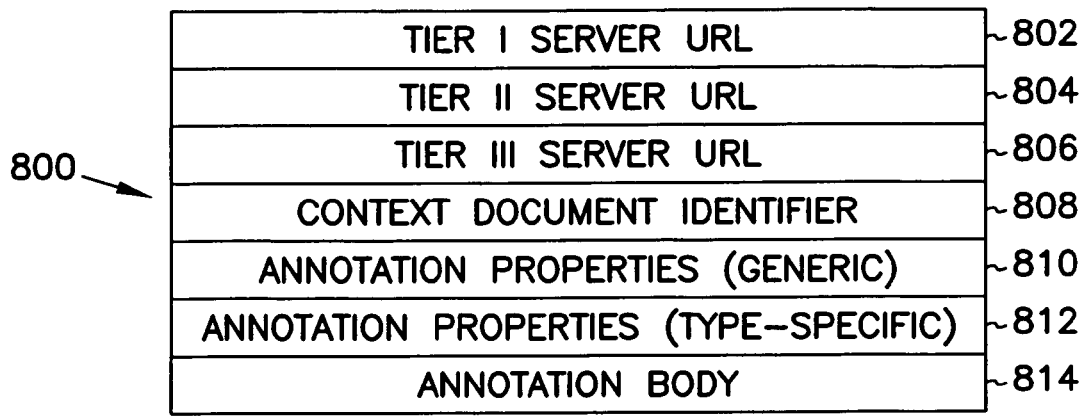
FIGS. 8, 9, and 10 are diagrams of data structures for use in an example embodiment of the invention.
Figure 9:
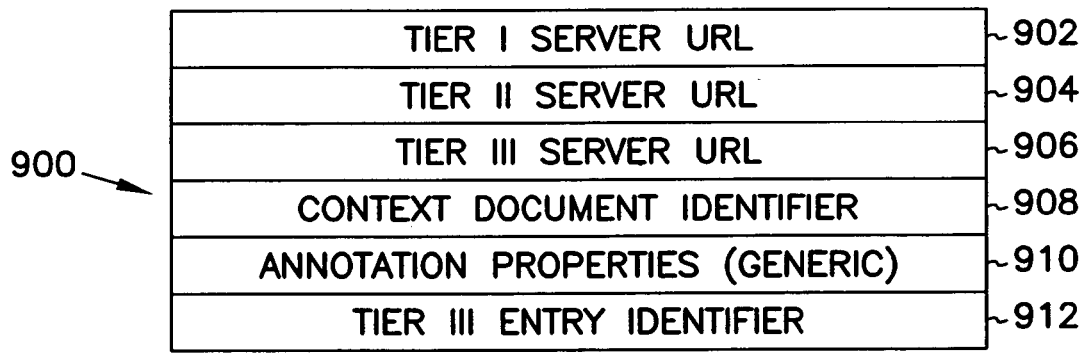
Figure 10:
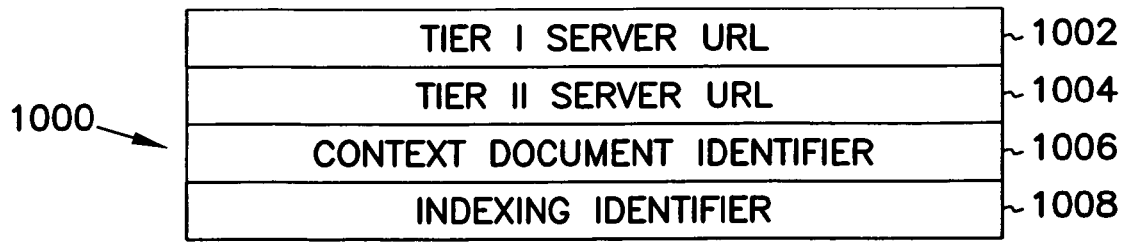

FIGS. 8, 9, and 10 are block diagrams of example data structures used during the process of posting an annotation as shown in FIG. 7. A "client-to-tier III server" data structure is shown in FIG. 8. A "tier III server-to-tier II server" data structure is shown in FIG. 9. A "tier II server-to-tier I server" data structure is shown in FIG. 10.

The "client-to-tier III server" data structure 800 shown in FIG. 8 comprises seven entries according to one embodiment of the invention. The "client-to-tier III server" data structure 800 is created when the client initiates an annotation post. A tier I server URL entry 802 contains data representing the URL for the tier I server the client is currently using. An tier II server URL entry 804 contains data representing the URL for the tier II server the client is currently using. A tier III server URL entry 806 contains data representing the URL for the tier III server the client is currently using. A context document identifier entry 808 contains data representing a reference to the annotated document. The annotation properties entry 810 contains data representing generic properties of the annotation. The annotation properties entry 812 contains data representing properties specific to a particular annotation type. The annotation body entry 814 contains data representing the actual data or body of the annotation.

The "tier III server-to-tier II server" data structure 900 shown in FIG. 9 comprises six entries according to one embodiment of the invention. The "tier III server-to-tier II server" data structure 900 is created by the tier III server and sent to the tier II server during the process of posting an annotation. A tier I server URL entry 902 contains data representing the URL for the tier I server the client is currently using. An tier II server URL entry 904 contains data representing the URL for the tier II server the client is currently using. A tier III server URL entry 906 contains data representing the URL for the tier III server the client is currently using. A context document identifier entry 908 contains data representing a reference to the annotated document. The annotation properties entry 910 contains data representing generic properties of the annotation. The tier III server entry identifier 912 contains data representing a unique identifier for the annotation entry stored on the tier III server.

The "tier II server-to-tier I server" data structure 1000 shown in FIG. 10 comprises four entries according to one embodiment of the invention. The "tier II server-to-tier I server" data structure 1000 is created by the tier II server and sent to the tier I server during the process of posting an annotation. A tier I server entry 1002 contains data representing the URL for the tier I server the client is currently using. An tier II server URL entry 1004 contains data representing the URL for the tier II server the client is currently using. A context document identifier entry 1006 contains data representing a reference to the annotated document. An indexing identifier entry 1008 contains data representing an index of the annotation such as a community identifier or the like.

Examples of the generic annotation properties (810, 908, 1006) shown in FIGS. 8, 9, and 10 include type, author name, subject, creation time, modify time, time to live, document identifier and parent identifier and the like. The type property identifies the annotation type (for example, threaded message, chat, and the like). The author name property identifies the name of the author of the annotation. The subject property identifies the subject of the annotation. The creation time property identifies the date and time when the annotation was created. The modify time property identifies the date and time when the annotation was last modified. The time to live property identifies how long the annotation will persist in the computing system for managing annotations. The document identifier identifies the web page or other document that the annotation is associated with. The parent identifier identifies the parent of the annotation if applicable.

The type-specific annotation properties (812) shown in FIG. 8 comprise any properties unique to a particular type of annotation. For example, for a chat type annotation, examples of type-specific annotation properties include room name, server, RSACi (Recreational Software Advisory Council on the Internet) ratings, description, and the like. For a Sprite type (an animated graphic image), examples of type-specific annotation properties include Running Time, Number of Frames, StartXPosition, StartYPosition and the like. For a text type annotation, an example of a type specific property is the character set encoding (such as ANSI) or the language.

In this section, data structures used during the process of posting an annotation according to one embodiment of the invention have been described. Alternate embodiments in which the data structures have additional or differing entries will be readily apparent to one of skill in the art and are considered within the scope of the invention.

Example Client Action Scenarios

Figure 11:
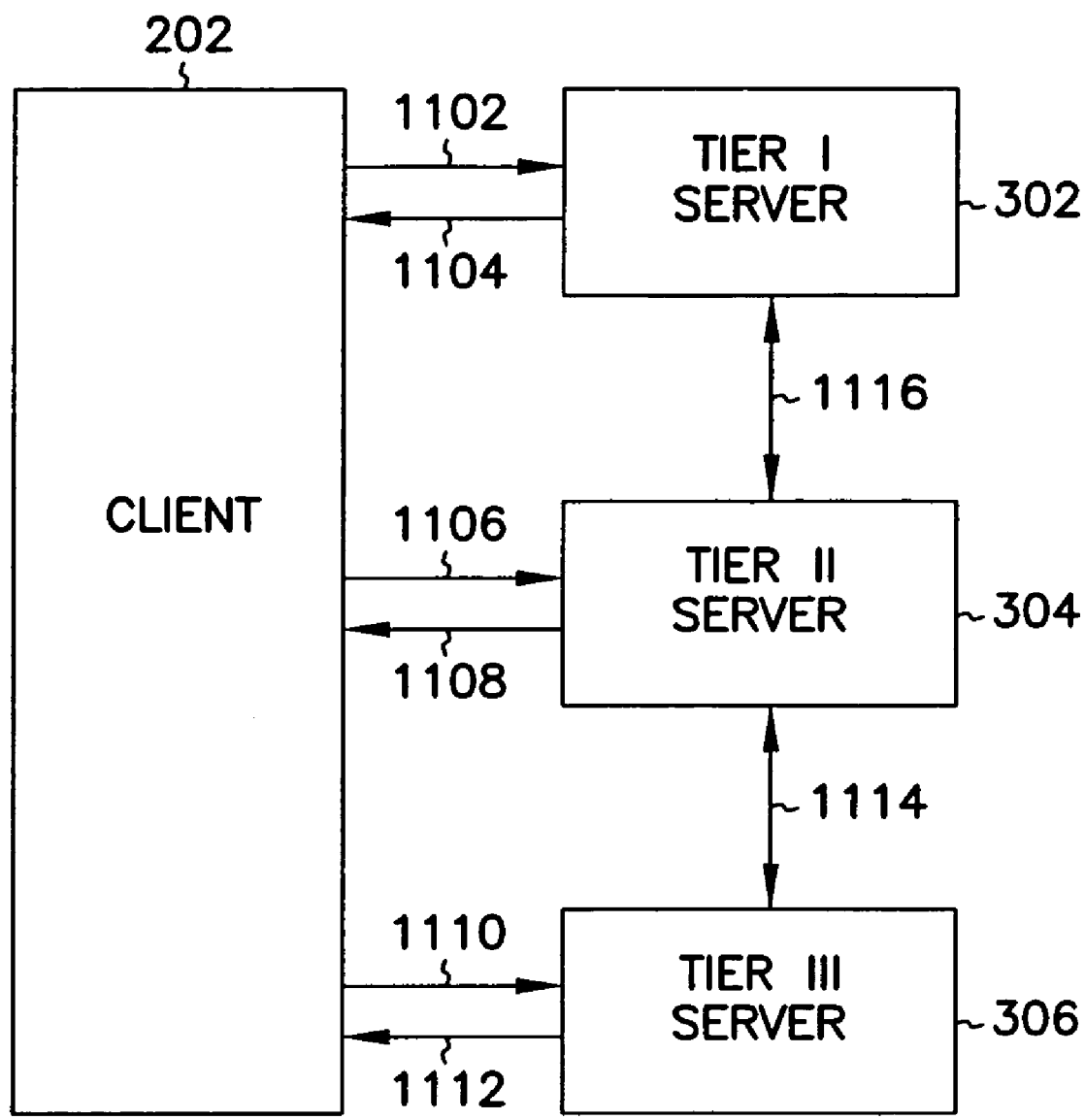
FIG. 11 is a block diagram illustrating the interaction between the client and the servers of an example embodiment of the computing system for managing annotations.

FIG. 11 is a block diagram illustrating the interaction between the client and the servers of a scalable architecture according to the present invention for several example actions. These example actions scenarios are provided for illustrative purposes only.

According to a first example action, the client 202 interacts directly with the tier I server 302 to check for annotations associated with a content source. To perform this action, the client 202 sends a request (line 1102) to the tier I server 302 to determine if any annotations exist for a particular content source. The tier I server 302 responds (line 1104) to the client 202 with a "True" or "False" indicator or the like depending on the presence or lack of annotations.

According to a second example action, the client 202 interacts directly with the tier II server 304 to get a list of annotation types associated with a content source for a specified indexing identifier. To perform this action, the client 202 sends a request (line 1106) to the tier II server 304 to determine what annotation types exist for a particular content source and a particular indexing identifier. The tier II server 304 verifies the client's right to view the annotation types for the specified indexing identifier. The tier II server 304 responds (line 1108) with a list of types of annotations. In one embodiment, the tier II server 304 also responds (line 1108) with a number indicating the number of each type of annotation.

According to a third example action, the client 202 interacts directly with the tier II server 304 to get a list of annotation headers associated with a content source for a particular indexing identifier. To perform this action, the client 202 sends a request (line 1106) to the tier II server 304 for a list of annotation headers for a particular content source and a particular indexing identifier. The tier II server 304 verifies the client's right to view the annotation headers for the particular indexing identifier. The tier II server 304 responds (line 1108) with a list of annotation headers. In one embodiment, the annotation headers include generic annotation properties such as type, author name, subject, and creation time and the like.

According to a fourth example action, the client 202 interacts directly with the tier III server to get the actual body or content of the annotation. To perform this action, the client 202 sends a request (line 1110) to the tier III server 306 for the content of a particular annotation. The tier III server 306 responds (line 1112) to the client 202 with the content of the particular annotation. In one embodiment, if the viewer or player needed for the annotation type is not present on the client 202, the tier III server 306 also responds with client software that enables a user to display or play the annotation.

According to a fifth example action, the client 202 interacts directly with the tier III server 306 to post an annotation. To perform this action the client 202 sends an annotation post (line 1110) to the tier III server. The tier III server adds the annotation post to its message queue and responds (line 1112) to the client with an indication of a successful annotation post. The tier III server 306 processes the annotation post and sends the annotation post information (line 1114) to the tier II server 304 according to the method described by reference to FIG. 7. The tier II server 304 processes the annotation post and sends the annotation post information (line 1116) to the tier I server 302 according to the method described by reference to FIG. 7. After the tier I server 302 processes the annotation, the annotation is available for the client 202 to access.

Microsoft's Community Explorer Implementation

In this section the protocols and data formats are described for a particular implementation of the invention that is used in Microsoft's® Community Explorer product. The Community Explorer product consists of a client component and several server components. The tier I server in the Community Explorer product is referred to as an Associations Server (AS). The tier II server in the Community Explorer product is referred to as an Annotated Community Server (ACS). The tier III server in the Community Explorer product is referred to as a Content Server (CS).

In the Community Explorer embodiment, the client-to-server communication and the server-to-server communication is achieved through a set of protocols and data formats as described in this section. The protocol used is HTTP (Hyper Text Transfer Protocol). The data formats are XML (Extensible Markup Language) and HTML (Hyper Text Markup Language). The HTTP/1.1 protocol with HTTP POSTs and GETs is used.

Client-to-Association Server. In one embodiment of the Community Explorer implementation, the protocol used between the client and the association server (AS) is HTTP. An example request made by the client to the AS checks for communities associated with a URL. The client POSTs a "CheckForAnnotations" request to the AS. The AS processor parses the request parameters and for each <ACTION> tag it performs that action's command. The AS responds with a "FALSE" indication if the URL does not have annotations. If the page has annotations, the AS responds with the names of the communities that annotated the page and the URLs to the respective annotated community server (ACS) server for each community.

The data format for an example "CheckForAnnotations" request is listed below. The example request checks for any annotations associated with "http://www.microsoft.com".
<?XML version="1.0"?>
<!DOCTYPE ANNOTATIONS SYSTEM "annotations.dtd">
<ANNOTATIONS>
  <APPLICATION>name="Microsoft Community Explorer" version="1.0">
  </APPLICATION>
<URL>http://www.microsoft.com/</URL>
<ACTION command="CheckForAnnotations"></ACTION>
<ANNOTATIONS>

The data format for an example response to the "CheckForAnnotations" request is listed below. The example response indicates that two communities (France 98 and Cranberries) annotated "http://www.microsoft.com".

```xml
<?XML version="1.0"?>
<!DOCTYPE ANNOTATIONS SYSTEM "annotations-
   .dtd">
<ANNOTATIONS>
   <APPLICATION name="Microsoft Association Server"
      version="1.0"></APPLICATION>
   <URL>http://www.microsoft.com</URL>
   <ACSURL>
      <ID>1<ID>
      <URL<http://plutont/ce/community.asp</URL>
   <ACSURL>
   <COMMUNITY>
      <ID>33</ID>
      <NAME>France 98</NAME>
      <ACSURL>1</ACSURL>
   </COMMUNITY>
   <COMMUNITY>
      <ID>50</ID>
      <NAME>Cranberries</NAME>
      <ACSURL>1</ACSURL>
   </COMMUNITY>
</ANNOTATIONS>
```

Client-to-Annotated Community Server. In one embodiment of the Community Explorer implementation, the protocol used between the client and the annotated community server (ACS) is HTTP. An example annotations request made by the client to the ACS comprises getting the annotation types that exist for a particular community and URL. Another example annotations request from the client to the ACS comprises getting the annotation headers for a particular annotation type, community and URL.

The data format for an example request is listed below. The example request includes the requested action and client credentials. The ACS parses the request parameters and for each <ACTION> tag, it performs that action's command. The request also contains the XML-encoded request-specific information, like parameters, properties and annotation text, inside the request entity body. The ACS returns an XML-formatted stream to the client. The example "GetAnnotationTypes" request is to get annotation types that exist in community 50 for the URL http://www.microsoft.com/.

```xml
<?XML version="1.0"?>
<!DOCTYPE ANNOTATIONS SYSTEM "annotations-
   .dtd">
<ANNOTATIONS>
   <APPLICATION name="Microsoft Community
      Explorer" version="1.0"></APPLICATION>
   <ACTION command="GetAnnotationTypes">
      <URL>http://www.microsoft.com</URL>
      <COMMUNITY>
         <ID>50</ID>
      </COMMUNITY>
   </ACTION>
</ANNOTATIONS>
```

The data format for an example response to the "GetAnnotationTypes" request is listed below. The example response indicates there are two threaded messages, one chat and no file libraries associated with "http://www.microsoft.com" in the community "50" space.

```xml
<?XML version="1.0"?>
<!DOCTYPE ANNOTATIONS SYSTEM "annotations-
   .dtd">
<ANNOTATIONS>
   <APPLICATION    name="Microsoft    ACS"ver-
      sion="1.0">
   </APPLICATION>
   <URL>http://www.microsoft.com</URL>
   <COMMUNITY>
      <ID>50</ID>
      <TYPE>
         <NAME>ThreadedMessages</NAME>
         <COUNT>2</COUNT>
      </TYPE>
      <TYPE>
         <NAME>Chats</NAME>
         <COUNT>1</COUNT>
      </TYPE>
      <TYPE>
         <NAME>File Libraries</NAME>
         <COUNT>0<COUNT>
      </TYPE>
   </COMMUNITY>
</ANNOTATIONS>
```

The data format for an example "GetAnnotationHeaders" request from the client to the ACS to get the headers of the two threaded messages from community whose ID is 50 is listed below.

```xml
<?XML version="1.0"?>
<!DOCTYPE ANNOTATIONS SYSTEM "annotations-
   .dtd">
<ANNOTATIONS>
   <APPLICATION name="Microsoft Community
      Explorer" version="1.0"></APPLICATION>
   <ACTION command="GetAnnotationHeaders">
      <COUNT>5</COUNT>
      <URL>http://www.microsoft.com</URL>
      <COMMUNITY>
         <ID>50</ID>
         <TYPE>
            <NAME>ThreadedMessages</NAME>
         <TYPE>
      </COMMUNITY>
   </ACTION>
<ANNOTATIONS>
```

The data format for an example response to the "GetAnnotationHeaders" request is listed below. The example response indicates that there are two threaded messages associated with "http://www.microsoft.com" that were annotated by community 50. Their headers are included in the response.

```xml
<?XML version="1.0"?>
<!DOCTYPE ANNOTATIONS SYSTEM "annotations-
   .dtd">
<ANNOTATIONS>
   <APPLICATION    name="Microsoft    ACS"ver-
      sion="1.0">
   </APPLICATION>
   <URL>http://www.microsoft.com</URL>
   <COMMUNITY>
      <ID>50</ID>
      <TYPE>ThreadedMessages</TYPE>
      <HEADER>
         <ID>1</ID>
         <AUTHOR>Highlander</AUTHOR>
         <DATE>3/26/98</DATE>
         <SUBJECT>I lost my sword</SUBJECT>
      <HEADER>
      <HEADER>
         <ID>44</ID>
         <AUTHOR>BillSo</TYPE>
         <DATE>3/26/98</DATE>
         <SUBJECT>The Communicate team Hawaii vaca-
            tion
         </SUBJECT>
```

</HEADER>
      </COMMUNITY>
</ANNOTATIONS>

Client-to-Content Server. In one embodiment of the Community Explorer implementation, standard HTTP Get requests are used between the client and the content server. An example request to retrieve a particular annotation is as follows:

http://ContentServer/isapi/fetch.dll?action=GetMessage&Number=1

XML Data Format. In one embodiment, the data format for responses to the client from the servers is XML. XML is a generalized markup language and it allows definition of a DTD (Document Type Definition) for annotations. The XML DTD (Document Type Definition) defines a custom markup "language" by defining tags, their order and what other tags they can contain. A DTD for the annotations' XML encoding is not required, but doing so defines the annotations' markup "language" syntax and allows XML processors to check its validity.

An example "CheckForAnnotations" request DTD is listed below. The example "CheckForAnnotations" DTD defines the format of a client's request to the AS for annotations a given context URL. In the example listed below, "APPLICATION" defines the name of the agent making the request and its version. "ACTION" defines the command the agent wants to make against the AS and any selectable attributes it wants in the response. The selectable attributes differ by command. "URL" defines the context URL of the agent.

```
<?XML version="1.0"?>
<!DOCTYPE ANNOTATIONS [
  <!ELEMENT ANNOTATIONS (APPLICATION, ACTION, URL)>
  <!ELEMENT APPLICATION (#PCDATA)>
  <!ELEMENT ACTION (#PCDATA)>
  <!ELEMENT URL (#PCDATA)>
  <!ATTLIST APPLICATION
    name CDATA #IMPLIED
    version CDATA #IMPLIED>
  <!ATTLIST ACTION
    command CDATA #REQUIRED
    select CDATA #IMPLIED>
]>
```

An example "CheckForAnnotations" response DTD is listed below. The example "CheckForAnnotations" response DTD defines the format of the AS server's response to the client for annotations. In the example "CheckForAnnotations" response DTD "APPLICATION" defines the name of the agent returning the response and its version. "URL" indicates the context URL this response corresponds to. "ACSURL" defines the annotated community server URLs used by the communities in the response. Zero or more ACSURL tags can appear, each with a unique numerical ID and the URL of the ACS. "COMMUNITY" defines the communities that are associated with the context URL. "ID" is a unique community ID. "NAME" is the community name. "ACSREF" references an entry in the set of ACSURL tags by that entry's ID. "POLICY" is a 4-letter code indicating the join policy of the community (selected by the client by specifying PLCY in the SELECT parameter of the ACTION tag). "STATUS" is a byte code indicating the status of the community (selected by the client by specifying STAT in the SELECT parameter of the ACTION tag).

```
<?xml version="1.0"?>
<!DOCTYPE ANNOTATIONS [
  <!ELEMENT ANNOTATIONS (APPLICATION, URL, ACSURL, COMMUNITY)>
  <!ELEMENT APPLICATION (#PCDATA)>
  <!ELEMENT URL (#PCDATA)>
  <!ELEMENT ACSURL (ID, URL)>
  <!ELEMENT COMMUNITY (ID, NAME, ACSREF, POLICY, STATUS)>
  <!ELEMENT ACSREF (#PCDATA)>
  <!ELEMENT NAME (#PCDATA)>
  <!ELEMENT ID (#PCDATA)>
  <!ELEMENT POLICY (#PCDATA)>
  <!ELEMENT STATUS (#PCDATA)>
  <!ATTLIST APPLICATION
    NAME CDATA #IMPLIED
    VERSION CDATA #IMPLIED>
]>
```

Example client action support by the Community Explorer service include checking for annotations, getting a list of known ACS URLs, getting the annotation types for annotations currently associated with a document, getting an identifier for all annotations for a particular annotation type, getting the headers for one or more annotations, posting an annotation, and getting a particular annotation.

CONCLUSION

A scalable computing system architecture capable of handling user requests for annotations to millions of documents each day has been described. The computing system consists of multiple tiers of servers. A tier I server indicates whether there are annotations associated with a content source. A tier II server indexes the annotations. A tier III server stores the body of the annotation.

Although specific embodiments have been illustrated and described herein, it will be appreciated by those of ordinary skill in the art that any arrangement which is calculated to achieve the same purpose may be substituted for the specific embodiments shown. This application is intended to cover any adaptations or variations of the present invention. Therefore, it is manifestly intended that this invention be limited only by the following claims and equivalents thereof.

We claim:

1. A computing system for scalably managing annotations, the computing system comprising:
   a tier III server for storing annotations;
   a tier II server for storing an index of the annotations stored on the tier III server, but not the annotations, that is separate and distinct from the tier III server, wherein the tier II server further stores a plurality of generic properties for the annotations; and
   a tier I server for determining if a content source has an index of the annotations stored on the tier II server that is separate and distinct from the tier II and tier III servers.

2. A computing system for scalably managing annotations, the computing system comprising:
   a tier III server for storing annotations, wherein the tier III server further stores one or more type specific properties for the annotations;
   a tier II server for storing an index of the annotations stored on the tier III server, but not the annotations, that is separate and distinct from the tier III server; and
   a tier I server for determining if a content source has an index of the annotations stored on the tier II server that is separate and distinct from the tier II and tier III servers.

3. A computing system for scalably managing annotations, the computing system comprising:
- a tier III server for storing annotations, wherein the tier III server further stores client software to allow a user to view a type of annotations;
- a tier II server for storing an index of the annotations stored on the tier III server, but not the annotations, that is separate and distinct from the tier III server; and
- a tier I server for determining if a content source has an index of the annotations stored on the tier II server that is separate and distinct from the tier II and tier III servers.

4. A scalable computerized method of posting an annotation, the method comprising:
- sending an annotation post from a client to a tier III server;
- storing a portion of the annotation post on the tier III server;
- sending a second portion of the annotation post from the tier III server to a tier II server that is separate and distinct from the tier III server;
- storing the second portion of the annotation post on the tier II server;
- sending association information from the tier II server to a tier I server that is separate and distinct from the tier II and tier III servers; and
- storing the association information on the tier I server.

5. The computerized method of claim 4, wherein the acts are performed in the order listed.

6. The computerized method of claim 4, further comprising notifying the client of a successful post to the tier III server.

7. The computerized method of claim 6, wherein notifying the client occurs prior to sending the second portion of the annotation to the tier II server.

8. The computerized method of claim 6, further comprising notifying the tier III server of a successful post to the tier II server.

9. The computerized method of claim 8, further comprising notifying the tier II server of a successful post to the tier I server.

10. The computerized method of claim 9, wherein sending the annotation post from the client to the tier III server comprises sending a URL for the tier I server, a URL for the tier II server, a URL for the tier III server, a context document identifier, type specific annotation properties, generic annotation properties, and an annotation body.

11. The computerized method of claim 10, wherein storing a portion of the annotation on the tier III server comprises storing the annotation body and the type specific annotation properties.

12. The computerized method of claim 11, further comprising generating a unique identifier for the annotation body and type specific annotation properties stored on the tier III server.

13. The computerized method of claim 12, wherein sending a second portion of the annotation to the tier II server comprises sending a URL for the tier I server, a URL for the tier II server, a URL for the tier III server, a context document identifier, generic annotation properties, and the unique identifier.

14. The computerized method of claim 13, wherein storing the second portion of the annotation on the tier II server comprises storing the generic annotation properties, the URL for the tier III server, and the unique identifier.

15. The computerized system of claim 14, wherein sending association information to the tier I server comprises sending the tier I server URL, the tier II server URL, the context document identifier and an indexing identifier.

16. A computer-readable medium having stored thereon a "client-to-tier III server" data structure for scalable annotations, comprising:
- a first field containing data representing a context document identifier;
- a second field containing data representing a body of the annotation;
- a third field containing data representing generic properties of the annotation;
- a fourth field containing data representing type specific properties of the annotation;
- a fifth field containing data representing a URL for a tier III server for receiving and storing a portion of the post of the annotation;
- a sixth field containing data representing a URL for a tier II server for receiving and storing a portion of the post of the annotation wherein the URL for the tier II server is distinct from the URL for the tier III server; and
- a seventh field containing data representing a URL for a tier I server for receiving and storing associations for the annotation, wherein the URL for the tier I server is distinct from the URLs for the tier II and tier III servers.

17. A computer-readable medium having stored thereon a "tier III server-to-tier II server" data structure for scalable annotations, comprising:
- a first field containing data representing a context document identifier;
- a second field containing data representing generic properties of the annotation;
- a third field containing data representing a URL for a tier III server for receiving and storing a portion of the post of the annotation;
- a fourth field containing data representing an identifier for the portion of the post of the annotation stored on the tier III server;
- a fifth field containing data representing a URL for a tier II server for receiving and storing a portion of the post of the annotation wherein the URL for the tier II server is distinct from the URL for the tier III server; and
- a sixth field containing data representing a URL for a tier I server for receiving and storing associations for the annotation, wherein the URL for the tier I server is distinct from the URLs for the tier II and tier III servers.

18. A computer-readable medium having stored thereon a "tier II server-to-tier I server" data structure for scalable annotations, comprising:
- a first field containing data representing a context document identifier;
- a second field containing data representing an indexing identifier of the annotation;
- a third field containing data representing a URL for a tier II server for indexing the annotation; and
- a fourth field containing data representing a URL for a tier I server for receiving and storing associations for the annotation, wherein the URL for the tier I server is distinct from the URL for the tier II server.

19. A scalable computerized method for managing annotations, the method comprising:
- storing within a tier I server reference to a tier II server storing an index that identifies a tier III server that stores an annotation associated with a content source;
- storing within a tier II server that is separate and distinct from the tier I server an index that identifies the tier III server that stores an annotation associated with a content source;

storing within a tier III server that is separate and distinct from the tier I and tier II servers the annotation associated with a content source;

receiving by the tier I server from a client a document identifier that identifies the content source; and providing a first response to the client from the tier I server, wherein the first response comprises one or more associations for the document identifier and a reference to a tier II server for each of the associations.

20. The method of claim 19, further comprising:

receiving by the tier II server from the client a selection identifying one of the associations for the document identifier;

providing a second response to the client from the tier II server, wherein the second response comprises a header for each of the annotations associated with the document identifier and the reference to the tier III server for each annotation.

21. The method of claim 20, further comprising:

receiving by the tier III server from the client a request for the annotation; and providing a third response to the client from the tier III server, wherein the third response comprises.

22. The computerized method of claim 21, wherein the document identifier is selected from the group consisting of a uniform resource locator, a file name, and a directory path.

* * * * *

UNITED STATES PATENT AND TRADEMARK OFFICE
CERTIFICATE OF CORRECTION

| | | |
|---|---|---|
| PATENT NO. | : 7,051,274 B1 | Page 1 of 2 |
| APPLICATION NO. | : 09/339733 | |
| DATED | : May 23, 2006 | |
| INVENTOR(S) | : Scott C. Cottrille et al. | |

It is certified that error appears in the above-identified patent and that said Letters Patent is hereby corrected as shown below:

On the title page, item (56), under "Other Publications", in column 2, line 16, delete "horizontal/html" and insert -- horizontal.html --, therefor.

On page 2, item (56), under "Other Publications", in column 2, line 7, delete "dph/annotations/annotations" and insert -- dph/annotation/annotations --, therefor.

In column 1, line 24, before "CROSS-REFERENCE" delete "CROSS-REFERENCES".

In column 1, line 29, delete "Communities." and insert -- Communities, --, therefor.

In column 1, line 35, delete "Source." and insert -- Source, --, therefor.

In column 3, line 19, delete "tier II" and insert -- tier III --, therefor.

In column 3, line 54, after "devices" insert -- . --.

In column 4, line 6, after "25" delete "." and insert -- , --, therefor.

In column 7, line 1, after "responds" delete "td" and insert -- to --, therefor.

In column 11, line 5, delete "Communities." and insert -- Communities, --, therefor.

In column 12, line 28, delete "tier II" and insert -- tier III --, therefor.

In column 12, line 43, delete "Microsoft's®D" and insert -- Microsoft's® --, therefor.

In column 13, line 24, delete "identity" and insert -- identify --, therefor.

In column 19, line 9, delete "<ID>1<ID>" and insert -- <ID>1</ID> --, therefor.

Signed and Sealed this

Twentieth Day of July, 2010

David J. Kappos
*Director of the United States Patent and Trademark Office*

CERTIFICATE OF CORRECTION (continued)
U.S. Pat. No. 7,051,274 B1

In column 19, line(s) 39–41, after "client." delete "The example "GetAnnotationTypes" request is to get annotation types that exist in community 50 for the URL http://www.microsoft.com/." and insert -- The example "GetAnnotationTypes" request is to get annotation types that exist in community 50 for the URL http://www.microsoft.com/. --, on Line 40, as a new paragraph.

In column 20, line 13, delete "<COUNT>0<COUNT>" and insert -- <COUNT>0</COUNT> --, therefor.

In column 20, line 37, delete "<ANNOTATIONS>" and insert -- </ANNOTATIONS> --, therefor.

In column 20, line 60, delete "<HEADER>" and insert -- </HEADER> --, therefor.

In column 23, line 5, in Claim 3, delete "annotations;" and insert -- annotation; --, therefor.

In column 23, line 66, in Claim 15, delete "system" and insert -- method --, therefor.

In column 26, line 9, in Claim 21, delete "comprises." and insert -- comprises the annotation. --, therefor.